(12) United States Patent
Lu et al.

(10) Patent No.: US 9,520,609 B2
(45) Date of Patent: Dec. 13, 2016

(54) FUEL PROCESSOR AND HYDROGEN PURIFICATION DEVICE THEREOF

(71) Applicant: Coretronic Corporation, Hsin-Chu (TW)

(72) Inventors: Yu-Wen Lu, Hsinchu County (TW); Jie-Ren Ku, Hsinchu County (TW); Chung-Ping Wang, Hsinchu County (TW); Yu-Hsiang Lin, Hsinchu County (TW); Yi-Chun Lin, Hsinchu County (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 199 days.

(21) Appl. No.: 14/341,131

(22) Filed: Jul. 25, 2014

(65) Prior Publication Data
US 2015/0118128 A1    Apr. 30, 2015

(30) Foreign Application Priority Data

Oct. 30, 2013   (CN) .......................... 2013 1 0526769

(51) Int. Cl.
*B01J 43/00*   (2006.01)
*B01J 45/00*   (2006.01)
(Continued)

(52) U.S. Cl.
CPC ............ *H01M 8/065* (2013.01); *B01J 39/043* (2013.01); *B01J 39/046* (2013.01); *B01J 41/043* (2013.01); *B01J 41/046* (2013.01); *B01J 43/00* (2013.01); *B01J 45/00* (2013.01); *B01J 47/002* (2013.01); *C01B 3/501* (2013.01);
(Continued)

(58) Field of Classification Search
CPC ................................. C01B 3/00; B01J 39/043
See application file for complete search history.

(56) References Cited

U.S. PATENT DOCUMENTS 7,329,348 B2 * 2/2008 Curello ............... H01M 8/0291
                                                              210/251
2003/0192251 A1   10/2003 Edlund et al.
(Continued)

FOREIGN PATENT DOCUMENTS

CN    1951800      4/2007
CN    101565165   10/2009
(Continued)

OTHER PUBLICATIONS

Machine Translation of JP2001-313057A (Apr. 5, 2016).*

*Primary Examiner* — Matthew Merkling
(74) *Attorney, Agent, or Firm* — WPAT, PC; Justin King

(57) ABSTRACT

A hydrogen purification device including a container, a first opening structure and a second opening structure is provided. The container has at least a filter material inside. The first opening structure is disposed in the container, wherein hydrogen-rich gas mixture flows into the container via the first opening structure so that purified hydrogen gas is generated by conducting a reaction between the hydrogen-rich gas mixture and the filter material. Besides, a second opening structure is disposed in the container, wherein the purified hydrogen gas flows away from the container via the second opening structure. A fuel processor having the hydrogen purification device is also provided.

16 Claims, 3 Drawing Sheets

(51) Int. Cl.

| | | |
|---|---|---|
| *B01J 47/02* | (2006.01) | |
| *C01B 3/00* | (2006.01) | |
| *H01M 8/06* | (2016.01) | |
| *C01B 3/50* | (2006.01) | |
| *B01J 39/04* | (2006.01) | |
| *B01J 41/04* | (2006.01) | |
| *B01J 47/00* | (2006.01) | |

(52) U.S. Cl.
CPC .......... *H01M 2250/20* (2013.01); *Y02E 60/36* (2013.01); *Y02E 60/50* (2013.01); *Y02T 90/32* (2013.01)

(56) References Cited

U.S. PATENT DOCUMENTS

| | | |
|---|---|---|
| 2008/0044696 A1 | 2/2008 | Knight et al. |
| 2011/0104021 A1* | 5/2011 | Curello .................. B01D 53/22 422/240 |
| 2013/0280627 A1 | 10/2013 | Chou et al. |

FOREIGN PATENT DOCUMENTS

| | | |
|---|---|---|
| CN | 103121663 | 5/2013 |
| JP | 2001313057 A * | 11/2001 |

* cited by examiner

FUEL PROCESSOR AND HYDROGEN PURIFICATION DEVICE THEREOF

FIELD OF THE INVENTION

The invention relates to a fuel processor and a hydrogen purification device thereof, and more particularly to a fuel processor and a hydrogen purification device thereof applied to a portable power system of hydrogen energy.

BACKGROUND OF THE INVENTION

In recent years, mobile electronic products, such as, tablet computers, cameras, and smart phones, are increasingly developed. It is observed that almost everyone has one or many. However, high power consumption of mobile electronic products is very troublesome. It is desirable to develop a cell having advantage of cheap price, long-time power supply, small volume, light weight and is suitable for various mobile electronic products.

Generally, fuel cells are cheap and of long-time power supply. However, consuming hydrogen gas, the fuel cells usually must offer enough space for hydrogen supply. Thus, the volume of fuel cells is too large to apply to various mobile electronic products. Hence, there is a strong need for solving problems of hydrogen supply for a small portable power system of hydrogen energy.

US Patent Publication No. 20030192251 discloses a fuel processing system including a fuel processor, wherein the fuel processor includes a hydrogen-producing region and a separation region. US Patent Publication No. 20080044696 discloses a hydrogen generation cartridge for supplying hydrogen gas to a fuel cell system.

SUMMARY OF THE INVENTION

In accordance with one aspect, the invention provides a hydrogen purification device applied to a portable power system of hydrogen energy. The hydrogen purification device includes a container, a first opening structure and a second opening structure. The container has at least a filter material inside. The first opening structure is disposed in the container, wherein hydrogen-rich gas mixture flows into the container via the first opening structure so that purified hydrogen gas is generated by conducting a reaction between the hydrogen-rich gas mixture and the filter material. Besides, a second opening structure is disposed in the container, wherein the purified hydrogen gas flows away from the container via the second opening structure.

In one embodiment, the filter material including an organic material and an inorganic material is disposed between the first opening structure and the second opening structure.

In one embodiment, the organic material is disposed on inner peripheries of the container and wraps the inorganic material.

In one embodiment, the filter material further includes a solid acid salt, wherein the organic material and the inorganic material are disposed between the solid acid salt and the second opening structure.

In one embodiment, the filter material further includes a liquid acid, wherein the organic material and the inorganic material are disposed between the liquid acid and the second opening structure.

In one embodiment, the organic material includes one selected from a group consisting of an ion exchange resin, cellulose, dextran gel, agarose gel, and humus, or a combination thereof.

In one embodiment, the ion exchange resin includes one selected from a high polymer resin group consisting of a styrene series, an acrylic acid series, an acetate series, an epoxy series, a vinyl pyridine series, a urea formaldehyde series, and a vinyl chloride series, or a combination thereof.

In one embodiment, the ion exchange resin includes one selected from a group consisting of a strong acid type, a weak acid type, a strong base type, a weak base type, a chelating type, an amphoteric type, and a redox type, or a combination thereof.

In one embodiment, the inorganic material includes one selected from a group consisting of acid salts, alumina, activated carbon, zeolites, molecular sieves, and montmorillonite, or a combination thereof.

In one embodiment, the filter material further includes a water absorbent material disposed between the first opening structure and the second opening structure.

In accordance with another aspect, the invention provides a fuel processor applied to a portable power system of hydrogen energy having a fuel cell. The fuel processor includes a hydrogen generation device and a hydrogen purification device. The hydrogen generation device has a solid hydrogen fuel and water disposed therein and is used to produce hydrogen-rich gas mixture by conducting a reaction between the solid hydrogen fuel and water. The hydrogen purification device includes a container, a first opening structure and a second opening structure. The container has at least a filter material inside. The first opening structure is disposed in the container, wherein the hydrogen-rich gas mixture flows into the container via the first opening structure so that purified hydrogen gas is generated by conducting a reaction between the hydrogen-rich gas mixture and the filter material. Besides, the second opening structure is disposed in the container, wherein the purified hydrogen gas flows away from the container via the second opening structure into the fuel cell.

In one embodiment, the solid hydrogen fuel includes one selected from a group consisting of borohydride, metal borohydride, nitrogen hydride, metal hydride, boron-nitrogen hydride, metal nitrogen hydride, metal boron-nitrogen hydride, metal carbon-nitrogen hydride, hydrocarbon, boron hydrocarbon, nitrogen hydrocarbon, metal hydrocarbon, metal boron hydrocarbon, boron-nitrogen hydrocarbon, and metal boron-nitrogen hydrocarbon, or a combination thereof.

In one embodiment, the solid hydrogen fuel includes one selected from a group consisting of ammonia borane ($H_3BNH_3$), diammoniate of diborane ($H_2B(NH_3)_2BH_4$), poly-(aminoborane), borazine ($B_3N_3H_6$), Morpholineborane (MPB), borane tetrahydrofuran complex, and diborane, or a combination thereof.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Similarly, the term "adjacent to" and variations thereof herein are used broadly and encompass directly and indirectly "adjacent to". Therefore, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
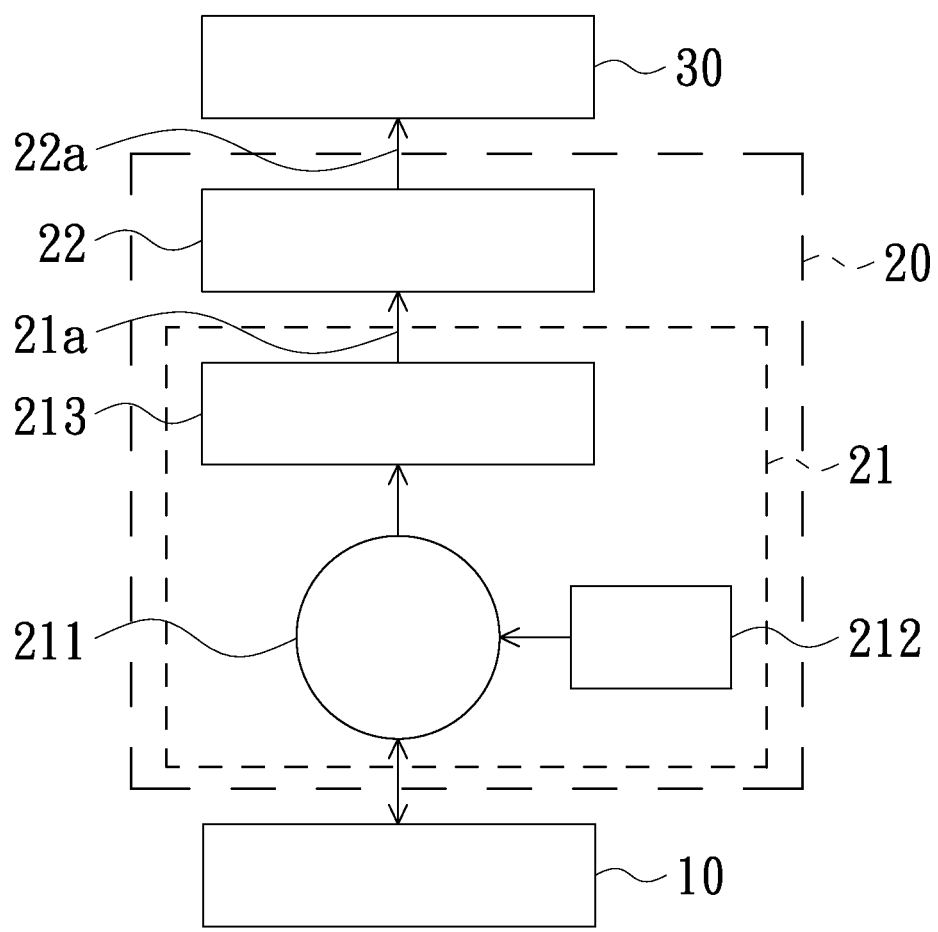
FIG. 1 schematically illustrates a portable power system of hydrogen energy in accordance with one embodiment of the invention.

With reference to FIG. 1, a portable power system of hydrogen energy in accordance with one embodiment of the invention is schematically illustrated. The portable power system of hydrogen energy 100 includes a control panel 10, a fuel processor 20 and a fuel cell 30. The fuel processor 20 has a hydrogen generation device 21 used to produce hydrogen gas serving as an energy source of a fuel cell 30 for generating electricity. The fuel cell 30 may convert chemical energy of the hydrogen gas into electrical energy. The hydrogen gas may be generated by conducting a chemical reaction between a hydrogen fuel and water. And a solid hydrogen fuel has advantage of high density of hydrogen storage resulting in the goal of cheap price, convenience, small volume, light weight and stable rate of hydrogen supply. Thus, a solid hydrogen fuel 213 is disposed inside the hydrogen generation device 21. In the hydrogen generation device 21, water in a bag 212 is pushed by a pump 211 to flow towards and contact the solid hydrogen fuel 213 for producing hydrogen gas. Besides, the pump rate of the pump 211 may be determined by the control panel 10 detecting amount of electricity generated by the fuel cell 30.

The solid hydrogen fuel 213 may include one selected from a group consisting of borohydride, metal borohydride, nitrogen hydride, metal hydride, boron-nitrogen hydride, metal nitrogen hydride, metal boron-nitrogen hydride, metal carbon-nitrogen hydride, hydrocarbon, boron hydrocarbon, nitrogen hydrocarbon, metal hydrocarbon, metal boron hydrocarbon, boron-nitrogen hydrocarbon, and metal boron-nitrogen hydrocarbon, or a random combination thereof. The solid hydrogen fuel 213 may also include one selected from a group consisting of ammonia borane ($H_3BNH_3$), diammoniate of diborane ($H_2B(NH_3)_2BH_4$), poly-(aminoborane), borazine ($B_3N_3H_6$), Morpholineborane (MPB), borane tetrahydrofuran complex, and diborane, or a combination thereof. For example, the following chemical reaction equation shows that sodium borohydride ($NaBH_4$), as the solid hydrogen fuel 213, reacts with water to produce hydrogen gas:

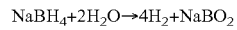

$$NaBH_4 + 2H_2O \rightarrow 4H_2 + NaBO_2$$

In order to increasing the reaction rate of the solid hydrogen fuel and water, a catalyst (not shown) may be mixed with the solid hydrogen fuel 213 in the hydrogen generation device 21. The catalyst may include solid acid or solid salt having ruthenium, cobalt, nickel, copper or iron.

Hydrogen-rich gas mixture 21a may be produced while the chemical reaction of solid hydrogen fuel 213 and water is conducted. That is, the hydrogen-rich gas mixture 21a includes not only hydrogen gas but also strong alkaline aerosol, ammonia and steam resulting from reaction heat. The performance of the fuel cell 30 would be impaired or even destroyed while the hydrogen-rich gas mixture 21a flows into the fuel cells 30. Thus, it is important to purify the hydrogen-rich gas mixture 21a.

Figure 2:
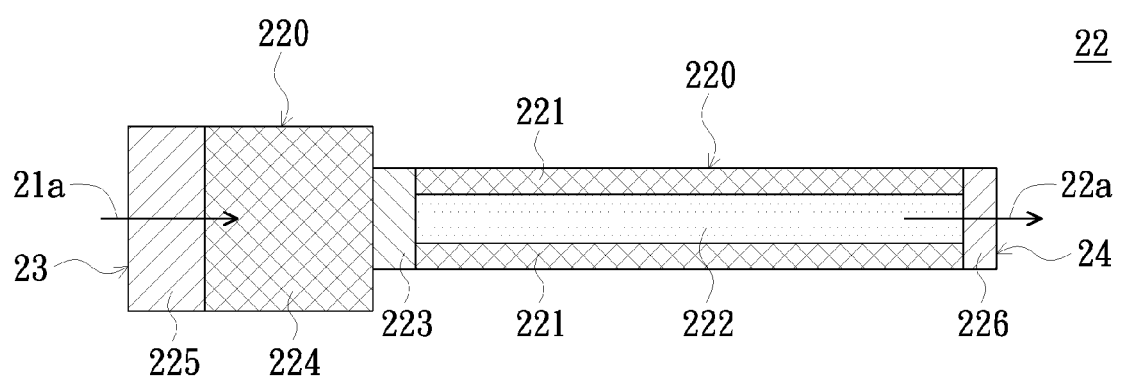
FIG. 2 schematically illustrates a hydrogen purification device in accordance with one embodiment of the invention.

A hydrogen purification device 22 in accordance with one embodiment of the invention is provided. Please refer to FIG. 1 and FIG. 2. FIG. 2 schematically illustrates a hydrogen purification device in accordance with one embodiment of the invention. A hydrogen purification device 22 may be disposed in the fuel processor 20 shown in FIG. 1. A hydrogen purification device 22 includes a container 220, a first opening structure 23 and a second opening structure 24. The first opening structure 23 and a second opening structure 24 are disposed in the container 220. It is to be noted that at least a filter material is placed inside the container 220 and between the first opening structure 23 and a second opening structure 24. In the embodiment of the invention, the hydrogen purification device 22 has the two opening structures 23 and 24 only. The hydrogen-rich gas mixture 21a flows into the container 220 via the first opening structure 23, and then the hydrogen-rich gas mixture 21a would pass through the filter material and flow toward the second opening structure 24. Between the two opening structures 23 and 24, the filter material may react with the hydrogen-rich gas mixture 21a to remove non-hydrogen substances, such as, alkaline aerosol/gas, ammonia or water/steam, to generate purified hydrogen gas 22a which includes at least substantially pure hydrogen gas. The goal of separating hydrogen gas from non-hydrogen substances may be achieved thereby. Then, the purified hydrogen gas 22a flows from the container 220 into the fuel cell 30 via the second opening structure 24.

In one embodiment of the invention, the filter material used by the hydrogen purification device 22 may contain an organic material or inorganic material or a combination thereof. The organic material may include one selected from a group consisting of an ion exchange resin, cellulose, dextran gel, agarose gel, and humus, or a random combination thereof. The inorganic material may include one selected from a group consisting of acid salts, alumina, activated carbon, zeolites, molecular sieves, and montmorillonite, or a random combination thereof. Moreover, the ion exchange resin may include one selected from a high polymer resin group consisting of a styrene series, an acrylic acid series, an acetate series, an epoxy series, a vinyl pyridine series, a urea formaldehyde series, and a vinyl chloride series, or a random combination thereof. The ion exchange resin may also include one selected from a group consisting of a strong acid type, a weak acid type, a strong base type, a weak base type, a chelating type, an amphoteric type, and a redox type, or a random combination thereof.

Furthermore, the filter material may further include a solid acid salt. The solid acid salt may include one selected from an organic acid group consisting of citric acid, malic acid, oxalic acid, acetic acid, tartaric acid, succinic acid, and lactic acid, or a random combination thereof. The filter material may further include a liquid acid which may be selected from an inorganic acid group consisting of hydrochloric acid, sulfuric acid, and nitric acid, or a random combination thereof.

In one embodiment of the invention, acid cation exchange resins having function group $H^+$ are capable of neutralizing alkaline aerosol. The function group $H^+$ of acid cation exchange resins may be also replaced by heavy metal ions and then the resins may adsorb ammonia. In one embodiment of the invention, base anion exchange resins may react with alkaline aerosol and ammonia by conducting an ion-exchange reaction and a neutralization reaction respectively. Alkaline aerosol and ammonia may be also adsorbed by the porosity of activated carbons. In one embodiment of the invention, the solid acid salt or the liquid acid may remove alkaline aerosol in a neutralization reaction. In addition, the catalyst may not only increase the rate of the reaction between the solid hydrogen fuel and water, but also remove alkaline aerosol and ammonia.

With reference to sheet 1, detecting results for purifying the hydrogen-rich gas mixture by using one or more than two kinds of the filter materials. Experimental processes in accordance with one embodiment of the invention as follows: water flows toward the solid hydrogen fuel at a fixed pump rate of the pump 211; the hydrogen-rich gas mixture 21a is produced by conducting the reaction between the solid hydrogen fuel and water, and then flows through one or more than two kinds of the filter materials so as to generate the purified hydrogen gas 22a; and then collecting the purified hydrogen gas 22a over time while the purified hydrogen gas flow rate reaches an optimum value, e.g. 300 standard cubic centimeter per minute (sccm); and then a detector is used to measure ammonia concentration in the purified hydrogen gas 22a; and then the purified hydrogen gas 22a is cool-condensed into a liquid; detecting the pH value of the cool-condensed liquid. Besides, ammonia concentration and pH value of the hydrogen-rich gas mixture 21a are also detected as a control group.

sheet 1

| filter material(s) | 20 min ammonia (ppm) | 45 min ammonia (ppm) | pH value of cool-condensed liquid |
|---|---|---|---|
| control group | 2 | 2 | >10 |
| acid cation exchange resin (IR-120) | ND | ND | 7.8 |
| anion exchange resin (IRA-400) | ND | ND | 6.8 |
| catalyst | ND | ND | 7.6 |
| IR-120 + 0.05 g citrate acid | ND | ND | 6.2 |
| IR-120 + 0.1 g citrate acid + catalyst | ND | ND | 6.3 |

According to sheet 1, without any filter material (control group), the hydrogen-rich gas mixture 21a contains ammonia at concentration of 2 ppm and pH value of the cool-condensed liquid is more than 10, showing that the hydrogen-rich gas mixture 21a contains strong alkaline aerosol. After the hydrogen-rich gas mixture 21a reacts with the filter material(s) listed in the sheet 1 respectively, no ammonia (the concentration thereof below about 0.1 ppm) in the purified hydrogen gas 22a is detected by the detector and the pH values are dropped at 20 minutes and 45 minutes after the start of the reaction. A conclusion can be drawn from the embodiment of the invention that the filter materials of the hydrogen purification device are capable of separating the hydrogen gas from alkaline aerosol and ammonia.

A slightly acid condition is beneficial for the fuel cell performance. Referring to the sheet 1, the filter materials including strong acid cation exchange resins and citrate acid result in the pH ranging from 6.2 to 6.3 as one of preferred embodiment of the invention. In detail, as shown in FIG. 2, the filter material, such as, the organic material 221 (e.g. strong acid cation exchange resin) is disposed or attached on inner peripheries of the container 220 and wraps the inorganic material 222 (e.g. activated carbon). The solid acid salt (e.g. citric acid) or the liquid acid 223 is disposed on a side of the organic material 221 and the inorganic material 222, and the side of the organic material 221 and the inorganic material 222 is adjacent to the first opening structure 23. An another organic material 224 may be placed between the first opening structure 23 and the solid acid salt 223 to enhance adsorption efficiency. Additionally, having a lot of hydrophilic groups may absorb steam/water and swelling by absorbing water after contacting with water, materials, such as activated carbon, molecular sieves, ion exchange resin and water absorbent polymers (hydro-absorbent macromolecules), are capable of absorbing steam/water resulting from reaction-heat in the fuel processor 20.

In one embodiment of the invention, the filter material may further include water absorbent materials 225 and 226 disposed adjacent to the first opening structure 23 and the second opening structure 24 respectively for absorbing steam in the fuel processor 20 resulting from the reaction heat. The water absorbent materials 225 and 226 may include cotton fibers mixed with one selected from a water absorbent polymer group consisting of polyacrylate, polyvinyl alcohol, vinyl acetate copolymers, polyurethane, polyethylene oxide, starch graft copolymers, rubber blends, and ion exchange resin, or a random combination thereof. The water absorbent materials 225 and 226 may also include cotton fibers mixed with one selected from an inorganic water absorbent group consisting of crystalline aluminum silicate, calcium chloride, calcium oxide, anhydrous cobalt chloride, anhydrous copper sulfate, silica gel, clay, alumina, activated carbon, zeolites, and molecular sieves, or a random combination thereof. As a result, in the embodiment of the invention, after the hydrogen-rich gas mixture 21a flowing into the container 220 of the hydrogen purification device 22 via the first opening structure 23 would sequentially react with the water absorbent material 225, the organic material 224, the solid acid salt 223, the combination of the strong acid cation exchange resin 221 and the inorganic material 222, and the water absorbent material 226 to generate the purified hydrogen gas 22*a*. Finally, the purified hydrogen gas 22*a* flows out of the container 220 via the second opening structure 24 into the fuel cell 30. Consequently, the purity of hydrogen gas may be enhanced effectively by the hydrogen purification device 22 in the embodiment.

The container 220 of the hydrogen purification device 22 may be a pipe and made of hard materials or flexible materials, such as, silica gel. An area of the filter material contacted with the hydrogen-rich gas mixture 21*a* may be greatly increasing within a limited space so as to noticeably enhance the purity of hydrogen gas while the container 220 made of flexible materials has a curled shape.

Figure 3:
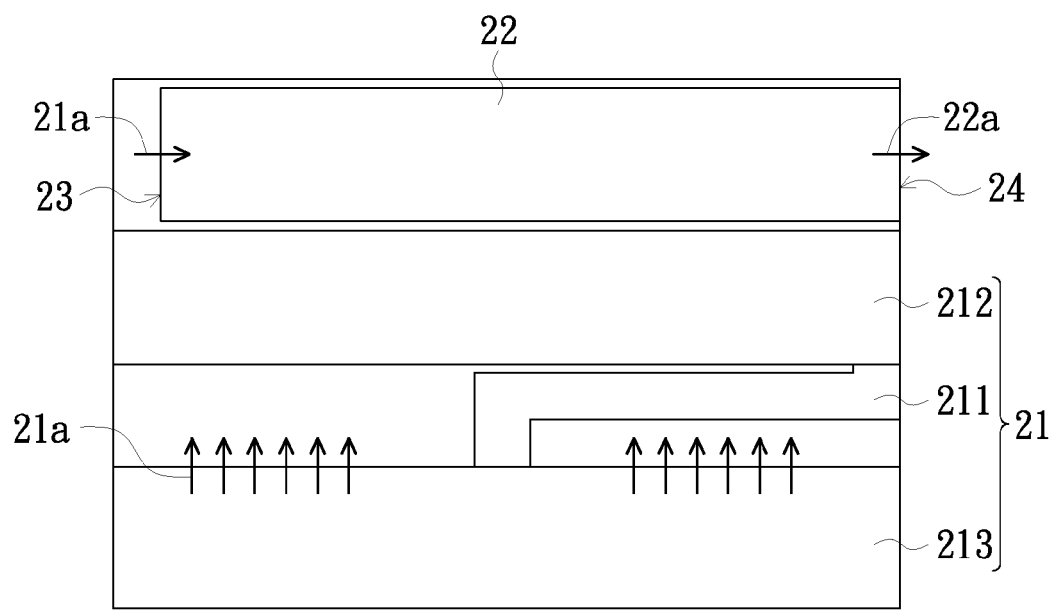
FIG. 3 schematically illustrates a fuel processor in accordance with one embodiment of the invention in a cross-section view.

In one embodiment of the invention, the device for hydrogen generation device 21 or the hydrogen purification device 22 may be a replaceable cartridge in the fuel processor 20. It is convenient for replacing a new hydrogen generation device 21 or a new hydrogen purification device 22 in the fuel processor 20 as the solid hydrogen fuel or water is completely exhausted or the filter materials are completely saturated. Besides, the fuel processor 20 may be a replaceable cartridge in the portable power system of hydrogen energy 100. With reference to FIG. 3, a fuel processor in accordance with one embodiment of the invention is schematically illustrated in a cross-section view. Inside the fuel processor 20, the hydrogen-rich gas mixture 21*a* produced by reacting the solid hydrogen fuel 213 with water flows upwards to the first opening structure 23 of the hydrogen purification device 22. The fuel processor 20 may have only one another opening namely the second opening structure 24. Thus, the purified hydrogen gas 22*a* automatically flows out of the fuel processor 20 via the second opening structure 24 into the fuel cell 30.

In summary, the hydrogen purification device or the fuel processor thereof in the invention may effectively remove ammonia and alkaline aerosol which are harmful to health and has advantage of concise installation, smaller volume, lighter weight, lower cost, easier fabrication, longer serves life and higher practicability for the portable power system of hydrogen energy. Utilizing solid hydrogen fuel increases the service life of the fuel processor 20, and the design of replaceable cartridge is easy for users to change the cartridge, increasing practicability for the portable power system of hydrogen energy.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A hydrogen purification device, applied to a portable power system of hydrogen energy, comprising:
   a container having at least a filter material inside, wherein the filter material comprises an organic material and an inorganic material;
   a first opening structure disposed in the container, wherein hydrogen-rich gas mixture flows into the container via the first opening structure and purified hydrogen gas is generated by conducting a reaction between the hydrogen-rich gas mixture and the filter material; and
   a second opening structure disposed in the container, wherein the purified hydrogen gas flows away from the container via the second opening structure, wherein the organic material and the inorganic material dispose between the first opening structure and the second opening structure, and the organic material is disposed on inner peripheries of the container and wraps the inorganic material.

2. The hydrogen purification device according to claim 1, wherein the filter material further includes a solid acid salt, and further wherein the organic material and the inorganic material are disposed between the solid acid salt and the second opening structure.

3. The hydrogen purification device according to claim 2, wherein the solid acid salt includes one selected from an organic acid group consisting of citric acid, malic acid, oxalic acid, acetic acid, tartaric acid, succinic acid, and lactic acid, or a random combination thereof.

4. The hydrogen purification device according to claim 1, wherein the filter material further includes a liquid acid, and further wherein the organic material and the inorganic material are disposed between the liquid acid and the second opening structure.

5. The hydrogen purification device according to claim 4, wherein the liquid acid includes one selected from an inorganic acid group consisting of hydrochloric acid, sulfuric acid, and nitric acid, or a random combination thereof.

6. The hydrogen purification device according to claim 1, wherein the organic material includes one selected from a group consisting of an ion exchange resin, cellulose, dextran gel, agarose gel, and humus, or a random combination thereof.

7. The hydrogen purification device according to claim 6, wherein the ion exchange resin includes one selected from a high polymer resin group consisting of a styrene series, an acrylic acid series, an acetate series, an epoxy series, a vinyl pyridine series, a urea formaldehyde series, and a vinyl chloride series, or a random combination thereof.

8. The hydrogen purification device according to claim 6, wherein the ion exchange resin includes one selected from a group consisting of a strong acid type, a weak acid type, a strong base type, a weak base type, a chelating type, an amphoteric type, and a redox type, or a random combination thereof.

9. The hydrogen purification device according to claim 1, wherein the inorganic material includes one selected from a group consisting of acid salts, alumina, activated carbon, zeolites, molecular sieves, and montmorillonite, or a random combination thereof.

10. The hydrogen purification device according to claim 1, wherein the filter material further includes a water absorbent material disposed between the first opening structure and the second opening structure.

11. The hydrogen purification device according to claim 10, wherein the water absorbent material includes cotton fibers mixed with one selected from a water absorbent polymer group consisting of polyacrylate, polyvinyl alcohol, vinyl acetate copolymers, polyurethane, polyethylene oxide, starch graft copolymers, rubber blends, and ion exchange resin, or a random combination thereof.

12. The hydrogen purification device according to claim 10, wherein the water absorbent material includes cotton fibers mixed with one selected from an inorganic water absorbent group consisting of crystalline aluminum silicate, calcium chloride, calcium oxide, anhydrous cobalt chloride, anhydrous copper sulfate, silica gel, clay, alumina, activated carbon, zeolites, and molecular sieves, or a random combination thereof.

13. A fuel processor, applied to a portable power system of hydrogen energy having a fuel cell, comprising:
a hydrogen generation device having a solid hydrogen fuel and water disposed therein and used to produce hydrogen-rich gas mixture by conducting a reaction between the solid hydrogen fuel and water;
a hydrogen purification device including:
a container having at least a filter material inside, wherein the filter material comprises an organic material and an inorganic material;
a first opening structure disposed in the container, wherein the hydrogen-rich gas mixture flows into the container via the first opening structure and purified hydrogen gas is generated by conducting a reaction between the hydrogen-rich gas mixture and the filter material; and
a second opening structure disposed in the container, wherein the purified hydrogen gas flows away from the container via the second opening structure into the fuel cell, wherein the organic material and the inorganic material dispose between the first opening structure and the second opening structure, and the organic material is disposed on inner peripheries of the container and wraps the inorganic material.

14. The fuel processor according to claim 13, wherein the solid hydrogen fuel includes one selected from a group consisting of borohydride, metal borohydride, nitrogen hydride, metal hydride, boron-nitrogen hydride, metal nitrogen hydride, metal boron-nitrogen hydride, metal carbon-nitrogen hydride, hydrocarbon, boron hydrocarbon, nitrogen hydrocarbon, metal hydrocarbon, metal boron hydrocarbon, boron-nitrogen hydrocarbon, and metal boron-nitrogen hydrocarbon, or a random combination thereof.

15. The fuel processor according to claim 13, wherein the solid hydrogen fuel includes one selected from a group consisting of ammonia borane, diammoniate of diborane, poly(aminoborane), borazine, Morpholineborane, borane tetrahydrofuran complex, and diborane, or a random combination thereof.

16. The fuel processor according to claim 13, wherein the hydrogen generation device further includes a catalyst mixed with the solid hydrogen fuel, wherein the catalyst includes solid acid or solid salt having ruthenium, cobalt, nickel, copper, or iron.

\* \* \* \* \*